(12) United States Patent
Wilby

(10) Patent No.: US 8,157,204 B2
(45) Date of Patent: Apr. 17, 2012

(54) DOUBLE FUSELAGE AIRCRAFT

(75) Inventor: Richard Wilby, Pibrac (FR)

(73) Assignee: Airbus, Blagnac (FR)

( * ) Notice: Subject to any disclaimer, the term of this patent is extended or adjusted under 35 U.S.C. 154(b) by 676 days.

(21) Appl. No.: 12/252,088

(22) Filed: Oct. 15, 2008

(65) Prior Publication Data

US 2010/0044521 A1    Feb. 25, 2010

(30) Foreign Application Priority Data

Oct. 16, 2007    (FR) ..................................... 07 07232

(51) Int. Cl.
    *B64B 1/20*    (2006.01)
(52) U.S. Cl. ............... 244/25; 244/35 R; 244/36; 244/13
(58) Field of Classification Search .................... 244/36, 244/35 R, 13, 25; D12/335–337
    See application file for complete search history.

(56) References Cited

U.S. PATENT DOCUMENTS

| | | | | | |
|---|---|---|---|---|---|
| D106,275 S | * | 10/1937 | Bellanca | ...................... | D12/335 |
| 2,140,783 A | * | 12/1938 | Bellanca | .......................... | 244/13 |
| D112,834 S | * | 1/1939 | De Seversky | ................ | D12/324 |
| D113,019 S | * | 1/1939 | Silverstein | ................... | D12/335 |
| D123,427 S | * | 11/1940 | Brandrup | ..................... | D12/335 |
| 2,224,641 A | * | 12/1940 | Burnelli | .......................... | 244/36 |
| D127,160 S | * | 5/1941 | Oliver | .......................... | D12/335 |
| D130,651 S | * | 12/1941 | Silverstein | .................. | D12/335 |
| 2,470,602 A | | 10/1945 | Campbell | | |
| 3,159,361 A | * | 12/1964 | Weiland | ....................... | 244/12.1 |
| D202,260 S | * | 9/1965 | McConologue | ............... | D25/11 |
| 3,907,218 A | * | 9/1975 | Miller | ............................... | 244/5 |
| 3,913,871 A | * | 10/1975 | Miller | ............................... | 244/5 |
| 4,165,058 A | | 8/1979 | Whitener | | |
| 5,425,515 A | * | 6/1995 | Hirose | ............................... | 244/5 |
| 5,884,873 A | * | 3/1999 | Breit | ............................. | 244/209 |
| 6,592,073 B1 | * | 7/2003 | Meekins | ......................... | 244/105 |
| 6,666,406 B2 | * | 12/2003 | Sankrithi et al. | ............... | 244/36 |
| 6,851,650 B2 | * | 2/2005 | Sankrithi | ....................... | 244/119 |
| 7,419,120 B2 | * | 9/2008 | Armand | .......................... | 244/36 |
| 7,735,774 B2 | * | 6/2010 | Lugg | ............................ | 244/12.3 |
| 7,866,604 B2 | * | 1/2011 | Barbara et al. | ............. | 244/118.5 |
| 7,900,865 B2 | * | 3/2011 | Moore et al. | .................. | 244/1 N |

OTHER PUBLICATIONS

J. Sugar, "Boomerang," 1-15 Popular Mechanics, Hearst Communications Inc., New York, NY, US, vol. 173, No. 11, Nov. 1, 1996, pp. 50-53.

* cited by examiner

*Primary Examiner* — Kaitlin Joerger
(74) *Attorney, Agent, or Firm* — Dickinson Wright PLLC

(57) ABSTRACT

Symmetric external parts of a front lower aircraft wing sweep forward such that lift generated by a rear upper wing is greater than lift generated by the front lower wing. The rear upper wing is in direct contact with rear upper parts of fuselages. A propulsion system of the aircraft has a turboprop engine and is carried by an internal part of the rear upper wing, with the propulsion system lying in a longitudinal mid-plane.

3 Claims, 3 Drawing Sheets

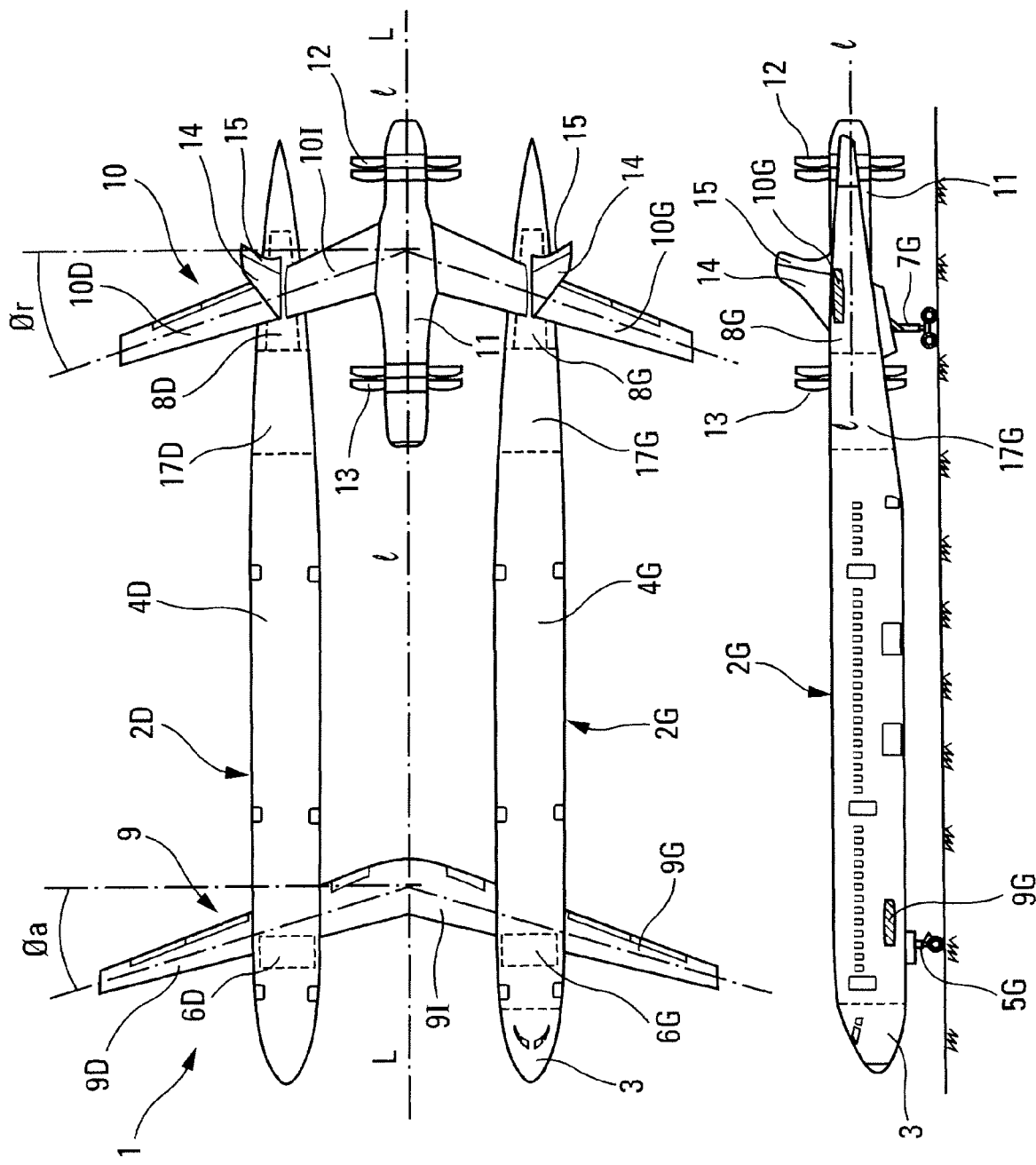

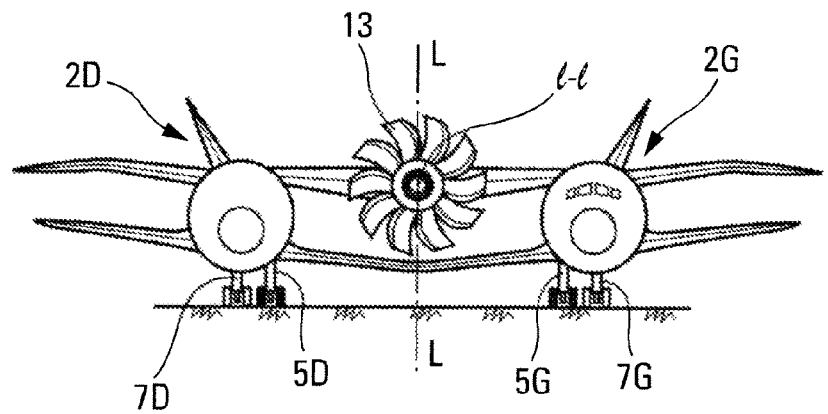
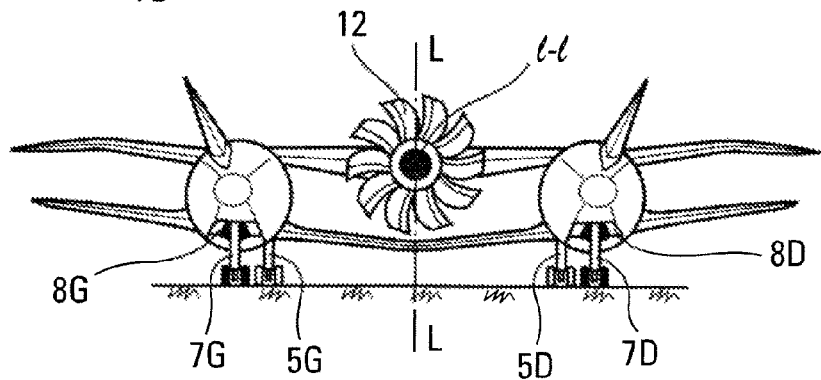
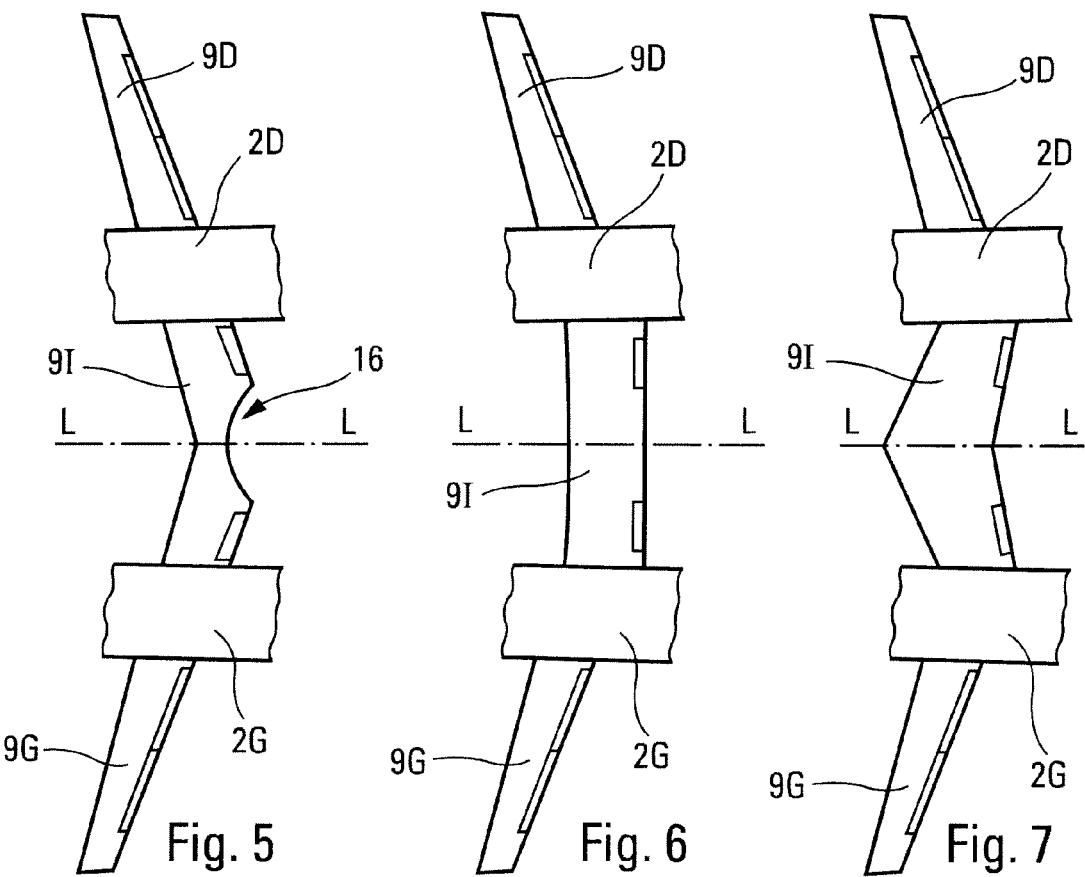

DOUBLE FUSELAGE AIRCRAFT

FIELD OF THE INVENTION

The present invention relates to a high-capacity transport aircraft. Although not exclusively, the aircraft of the present invention is particularly suited to civilian passenger air transport.

BACKGROUND OF THE RELATED ART

It is known that one of the ways to combat airline saturation (and the associated disadvantages such as busy periods at airports, the noise near such airports, etc.) is to increase the carrying capacity of the aircraft.

Of course, for an improved-capacity transport aircraft such as this to be successfully commercially operable, it is essential that its operating costs be lower than the sum of those of the aircraft it is supposed to replace. In particular, its fuel consumption needs to be modest, which means that its mass and drag need to be measured and that its propulsion system needs to be relative frugal.

American U.S. Pat. No. 4,165,058 already discloses an improved-capacity transport aircraft comprising two parallel fuselages with a front lower wing supporting the front lower parts of the two fuselages and a rear upper wing supported by the rear upper parts of those fuselages.

An aircraft such as this has the advantage of having a structure that is particularly robust because it is able to withstand bending moments. What this means is that its mass can be relatively low by comparison with the total mass of two aircraft each having one of the fuselages. By contrast, the aerodynamic effect that the front lower wing has on the rear upper wing generates a great deal of induced drag, especially since the lift generated by each of said wings is preferably the same. In an attempt to avoid such excessive drag, this American U.S. Pat. No. 4,165,058 makes provision for moving the rear upper wing up away from the fuselage by raising it up on very tall vertical struts. This then leads to a loss of flexural rigidity of the structure, to excessive vertical size and, in all probability, to the aircraft being difficult to fly because of the ensuing high position of the center of gravity.

Furthermore, it is known that, for the same propulsive power, the fuel consumption of a turboprop engine with at last one propeller is far lower (of the order of 15% lower) than that of a turboshaft engine. It would therefore be advantageous, in aircraft, to replace turboshaft engines with turboprop engines. However, turboprop engines have the disadvantages firstly of requiring a large ground clearance because of the propeller or propellers with which they are equipped, and secondly of requiring steps to be taken to prevent debris from said turboprops or the propellers thereof from damaging or even destroying said aircraft should such turboprops or propellers break. Of course, such steps are generally expensive both in terms of cost and in terms of weight.

SUMMARY OF THE INVENTION

It is an object of the present invention to produce an increased-capacity transport aircraft that enjoys the advantages firstly of the known twin-fuselage aircraft structure mentioned hereinabove and, secondly, of turboprop propulsion, without thereby having to tolerate the associated disadvantages thereof.

To this end, according to the invention, the increased-capacity transport aircraft comprising:
  two parallel fuselages spaced symmetrically apart with respect to a longitudinal mid-plane;
  a front lower wing that is symmetric with respect to said longitudinal mid-plane and supports the front lower parts of said fuselages;
  a rear upper wing that is symmetric with respect to said longitudinal mid-plane and is supported by the rear upper parts of said fuselages; and
  a propulsion system,
is notable in that
  at least the symmetric external parts of said front lower wing have a sweep forward;
  the lift generated by said rear upper wing is greater than the lift generated by said front lower wing;
  said rear upper wing is in direct contact with the rear upper parts of said fuselages; and
  said propulsion system comprises at least one turboprop engine having at least one propeller and is carried by the internal part of said rear upper wing, the axis of said propulsion system lying on said longitudinal mid-plane.

Thus, according to the invention, the vortices generated by said front lower wing are minimized thanks to the sweep forward thereof. In addition, because the lift generated by said front lower wing is lower, the aerodynamic disturbances caused by this wing are also reduced accordingly. What this means is that the drag induced by said front lower wing is itself lower, so that said rear upper wing no longer needs to be spaced away from the fuselages by vertical struts but can be in direct contact with the rear upper parts of said fuselages. Full benefit of the robustness and lightness of weight of the known twin-fuselage aircraft structure can thus be enjoyed. Of course, in order further to increase the lightness of weight of said structure, it may be made at least partially from a resin-fiber composite.

It has been found that an aircraft overall lift distribution of the order of 40% from the front lower wing and 60% from the rear upper wing is advantageous.

Further, because in the aircraft according to the present invention the propulsion system is borne by said rear upper wing, there is no problem regarding ground clearance for the propeller or propellers of the turboprop or turboprops of said propulsion system. This ground clearance can be provided without making the overall landing gear of the aircraft excessively tall. Advantageously, this overall landing gear may comprise four sets of landing gear distributed at the front and rear of the two fuselages respectively.

Advantageously, said propulsion system comprises at least one turboprop with at least one pusher propeller positioned behind said rear upper wing. It may also comprise at least one turboprop having at least one tractor propeller positioned in front of said rear upper wing. In the latter instance, it is advantageous for said turboprop with at least one pusher propeller and said turboprop with at least one tractor propeller to be enclosed in a common cell borne by said rear upper wing.

It will be noted that, in a layout such as this, the pusher propeller or propellers lies or lie facing the rear ends of the two fuselages, which are generally neither pressurized nor vital to the aircraft. There is therefore no need to worry that, in the event that the turboprop that drives the pusher propeller or propellers explodes or in the event that debris therefrom is thrown out, the potential resulting damage to said fuselages will lead to the loss of the aircraft.

Furthermore, because said rear upper wing also preferably has a sweep forward for aerodynamic reasons, there is no longer any need to worry that any debris expelled from the pusher propeller or propellers or from the turboprop that drives it or them will be able to destroy said wing.

The tractor propeller or propellers are positioned in front of said rear upper wing so as not to risk damaging this wing, even in the aforementioned preferred embodiment whereby said rear upper wing has a sweep forward.

Those parts of said fuselages that face the tractor propeller or propellers advantageously consist of partially pressurized chambers that run no risk of exploding should they be damaged by any debris from said propellers or from the turboprop that drives them, but which can act as baggage holds. As a preference, each of said partially pressurized chambers is located between the passenger cabin and the rear landing gear bay which are formed in the corresponding fuselage.

Each passenger cabin is, in the customary way, air-conditioned by a stream of conditioning air and has a discharge valve capable of air-controlling the discharge of said stream of air-conditioning air to outside said aircraft. It is then advantageous for each of said chambers to be partially pressurized using said stream of air-conditioning air that pressurizes the corresponding passenger cabin. To do that, said discharge valve from said cabin can be made to close and to open and the following are provided:

a communication allowing a controlled flow of air between said passenger cabin and said chamber, it being possible to instigate the opening and closure of said communication, and an additional operable discharge valve positioned in said chamber and capable of placing this chamber in communication with the outside of the aircraft.

Thus, under normal conditions, the air-conditioning air stream is discharged from said passenger cabin through said chamber (via said controlled airflow communication and said additional valve), thus allowing this chamber to be partially pressurized whereas if said chamber should become damaged and suffer a loss of pressure, the air-conditioning air will be able to leave through said cabin discharge valve.

A safety device guarding against overpressure may be provided between said chamber and said rear landing gear bay.

The internal part of said front lower wing, contained between the two fuselages, may have various shapes. It may, for example, be straight. It may also have the shape of a circumflex accent that is symmetric with respect to said longitudinal mid-plane and have the same sweep forward as said external parts of said front lower wing.

In the latter instance it is advantageous, as far as the air supply to said propulsion system is concerned, for the trailing edge of said internal part to comprise a central cut-out.

As an alternative, said internal part of said front lower wing may just as well have the shape of a circumflex accent that is symmetric with respect to said longitudinal mid-plane but have a sweep back that is the opposite of the sweep forward of said external parts of said front lower wing.

BRIEF DESCRIPTION OF THE DRAWINGS

The figures of the attached drawing will make it easy to understand how the invention may be embodied. In these figures, identical references denote elements that are similar.

FIG. 1 is a plan view of one exemplary embodiment of an airplane according to the present invention.

FIGS. 2, 3 and 4 are, respectively, a view from the side, a view from the front and a view from the rear of the airplane of FIG. 1, resting on the ground.

FIGS. 5, 6 and 7 show alternative forms of embodiment of the intermediate part of the front lower wing of the airplane of FIGS. 1 to 4.

DETAILED DESCRIPTION OF THE INVENTION

Figure 8:
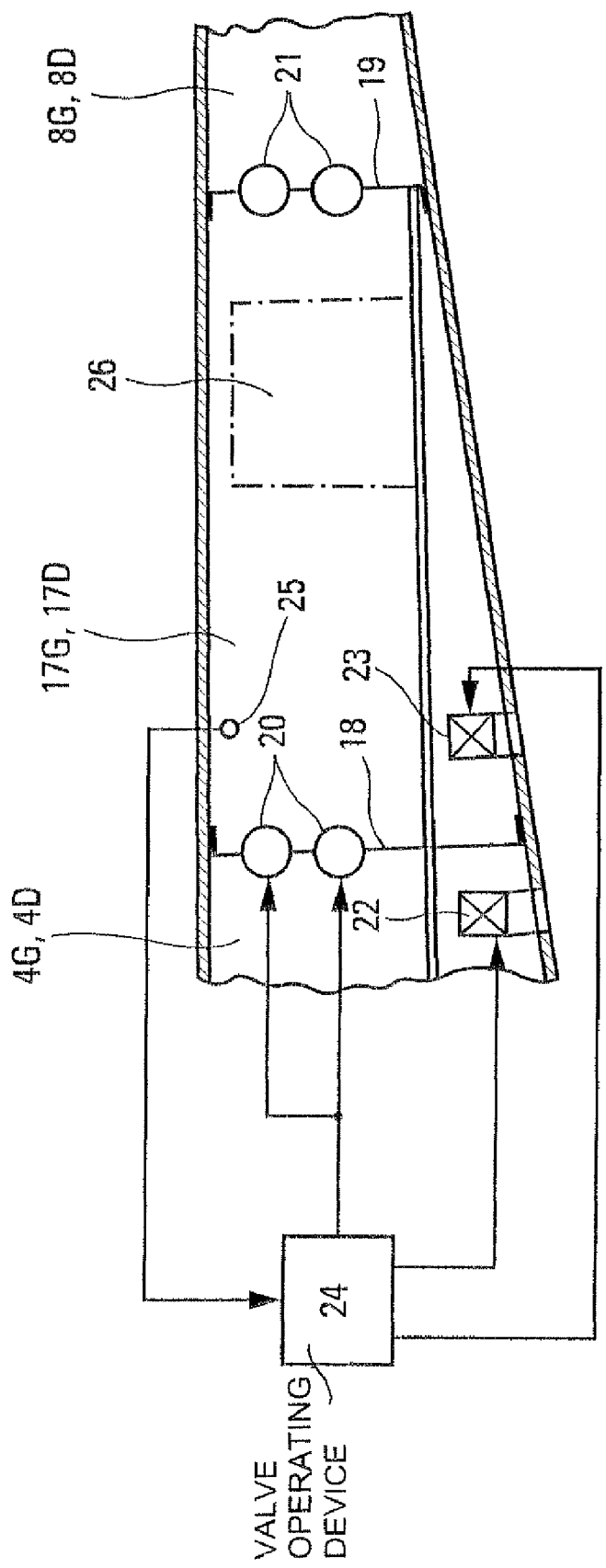
FIG. 8 schematically depicts, in partial section, the rear part of each fuselage of the airplane contained between the passenger cabin and the rear landing gear bay.

The exemplary embodiment 1 of the airplane according to the present invention as shown by FIGS. 1 to 4 comprises two parallel fuselages 2G and 2D separated symmetrically from one another with respect to a vertical longitudinal mid-plane L-L.

The two fuselages 2G and 2D have identical exterior shapes. However, only one of them has a flight deck 3. Each of them delimits a passenger cabin 4G or 4D and has front landing gear 5G or 5D that can be retracted into a front landing gear bay 6G or 6D, and rear landing gear 7G or 7D that can be retracted into a rear landing gear bay 8G or 8D.

At the front, the airplane 1 of FIGS. 1 to 4 has a lower wing 9, provided with flaps, ailerons, etc. in the usual way and supporting the front lower parts of the two fuselages 2G and 2D. The front lower wing 9 is symmetric with respect to the vertical longitudinal mid-plane L-L and both its external parts 9G and 9D (external to the fuselages 2G and 2D) and its internal part 9I (contained between said fuselages) have a sweep forward by an angle $\Phi a$, for example of the order of 20°.

At the rear, the airplane 1 of FIGS. 1 to 4 has an upper wing 10, provided with flaps, ailerons, etc. in the usual way and supported directly by the rear upper parts of the two fuselages 2G and 2D, without being spaced away therefrom by struts or the like. The rear upper wing 10 is symmetric with respect to the vertical longitudinal mid-plane L-L and both its external parts 10G and 10D (external to the fuselages 2G and 2D) and its internal part 10I (contained between said fuselages) have a sweep forward by an angle $\Phi r$, for example of the order of 20°.

The surface area of the rear upper wing 10 is greater than the surface area of the front lower wing 9 which means that the lift created by the latter is lower than that created by said rear upper wing 10. For example, the respective lift created by the front lower wing and by the rear upper wing may be of the order of 40% and 60% of the total lift created by the airplane 1.

The internal part 10I of the rear upper wing 10 bears a nacelle 11 containing a propulsion system comprising two turboprop engines, one of which has pusher propellers 12 and the other of which has tractor propellers 13. The axis l-l of said propulsion system and of the nacelle 11 lies in the vertical longitudinal mid-plane L-L.

The pusher propellers 12 and the tractor propellers 13 are positioned respectively behind and in front of the rear upper wing 10 so that any debris from said propellers 12 and 13 cannot reach this wing if these propellers should break.

The airplane 1 additionally comprises, in the usual way, at least one vertical stabilizer 14 provided with at least one rudder 15.

In the exemplary embodiment of FIG. 1, the internal part 9I of the front lower wing 9 has the shape of a circumflex accent that is symmetric with respect to the longitudinal mid-plane L-L and has the same sweep forward $\Phi a$ as the external parts 9G and 9D of this wing 9. This internal part 9I, with a sweep forward, in flight leads only to a very small induced drag on the rear upper wing 10. However, it may be the case that this internal part 9I with a sweep forward causes significant central suction that detracts from the effectiveness of the propellers 12 and 13. Where such is the case, it may be advantageous to reduce this suction by making a central cut-out 16 (see FIG. 5) in the trailing edge of said internal part 9I.

FIG. 6 depicts an internal part 9I of straight shape whereas in the example of FIG. 7, said internal part 9I has the shape of a circumflex accent that is symmetric with respect to the longitudinal mid-plane L-L and has a sweep back that is the opposite of the sweep forward of the external parts 9G and 9D of the front lower wing 9. An internal part 9I such as this with a sweep back minimizes the central suction and encourages the supply of air to the propulsion system 11, 12, 13 but, on the other hand, it does increase the drag induced on the upper rear wing 10.

As mentioned hereinabove, for the purposes of safety in the event of breakage of the tractor propellers 13, each fuselage 2G, 2D comprises a partially pressurized chamber 17G, 17D facing these propellers, said chamber being positioned between the corresponding passenger cabin 4G, 4D and the corresponding rear landing gear bay 8G, 8D.

As shown by FIG. 8, partitions 18 and 19 separate the chamber 17G, 17D respectively from the passenger cabin 4G, 4D and from the rear landing gear bay 8G, 8D. Mounted in the partition 18 is at least one operable valve 20 capable of establishing a controlled flow of air between the cabin 4G, 4D and the chamber 17G, 17D. Mounted in the partition 19 is at least one safety valve 21 capable of removing any overpressure in the chamber 17G, 17D to the landing gear bay 8G, 8D. In addition, the cabin 4G, 4D and the chamber 17G, 17D each comprise an operable discharge valve 22, 23 capable of establishing a fluid communication between them and the outside of the aircraft. An operating device 24 is capable of operating the valves 20, 22 and 23 under the control of a pressure sensor 25 positioned in the chamber 17G, 17D.

In normal operation, the operating device 24 opens the valves 20 and 23 and closes the valve 22. As a result, the stream of air-conditioning air flowing through the cabin 4G, 4D passes through the operable valve 20 and enters the chamber 17G, 17D from where it is discharged to the outside through the valve 23. In this operating scenario, it is therefore the valves 20 and 23 that regulate the flow of air-conditioning air in the cabin 4G, 4D. In so doing, they at the same time partially pressurize the chamber 17G, 17D which can therefore be used as a hold to contain freight, luggage, food, etc. as symbolized by the rectangle 26.

If, as a result of a breakage of a propeller 13 or for any other reason, the chamber 17G, 17D becomes damaged and loses pressure, this is detected by the pressure sensor 25 which transmits this information to the operating device 24. The latter then closes the valves 20 and 23 and opens the valve 22 which then regulates the air-conditioning of the cabin 4G, 4D, the chamber 17G, 17D thus being isolated from this cabin.

Moreover, as is known, a high-mounted wing such as the rear upper wing 10 gives an aircraft superior yaw stability than a low-mounted wing, such as the front lower wing 9. Possibly, in order to avoid such a difference in the level of yaw stability of said wings 9 and 10, the ends of the rear upper wing 10 may be curved slightly downward as can be seen in FIGS. 3 and 4.

The invention claimed is:

1. An aircraft comprising:
    two parallel fuselages spaced symmetrically apart with respect to a longitudinal mid-plane;
    a front lower wing that is symmetric with respect to said longitudinal mid-plane and supports the front lower parts of said fuselages;
    a rear upper wing that is symmetric with respect to said longitudinal mid-plane and is supported by the rear upper parts of said fuselages; and
    a propulsion system, wherein:
    at least symmetric external parts of said front lower wing have a sweep forward;
    lift generated by said rear upper wing is greater than lift generated by said front lower wing;
    said rear upper wing is in direct contact with the rear upper parts of said fuselages;
    said propulsion system comprises at least one first turboprop engine having at least one propeller and is carried by the internal part of said rear upper wing, the axis of said propulsion system lying on said longitudinal mid-plane;
    said propeller is a tractor propeller positioned in front of said rear upper wing;
    each of said fuselages has a partially pressurized chamber facing said tractor propeller and comprises a passenger cabin and a rear landing gear bay for rear landing gear; and
    each partially pressurized chamber is located between the corresponding passenger cabin and the corresponding rear landing gear bay.

2. The aircraft as claimed in claim 1, in which each passenger cabin is air-conditioned by a stream of air-conditioning air and has a discharge valve capable of discharging said stream of air-conditioning air to outside said aircraft, wherein said discharge valve from said cabin can be made to close and to open and wherein the following are provided:
    a communication allowing a controlled flow of air between said passenger cabin and said chamber, it being possible to instigate the opening and closure of said communication, and an additional operable discharge valve positioned in said chamber and capable of placing this chamber in communication with the outside of the aircraft.

3. The aircraft as claimed in claim 2, wherein a safety device guarding against overpressure is provided between said chamber and said rear landing gear bay.

* * * * *